(12) United States Patent
Yasukawa

(10) Patent No.: US 9,807,268 B2
(45) Date of Patent: Oct. 31, 2017

(54) IMAGE FORMING APPARATUS HAVING FIRMWARE UPDATE FUNCTION, METHOD OF CONTROLLING THE SAME, PROGRAM FOR EXECUTING THE METHOD, AND STORAGE MEDIUM

(71) Applicant: CANON KABUSHIKI KAISHA, Tokyo (JP)

(72) Inventor: Akari Yasukawa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/024,554

(22) PCT Filed: Nov. 11, 2014

(86) PCT No.: PCT/JP2014/080283
§ 371 (c)(1),
(2) Date: Mar. 24, 2016

(87) PCT Pub. No.: WO2015/072559
PCT Pub. Date: May 21, 2015

(65) Prior Publication Data
US 2016/0234396 A1   Aug. 11, 2016

(30) Foreign Application Priority Data

Nov. 15, 2013  (JP) ................. 2013-236927

(51) Int. Cl.
*G06F 15/00*   (2006.01)
*H04N 1/00*   (2006.01)
(Continued)

(52) U.S. Cl.
CPC .......... *H04N 1/00973* (2013.01); *B41J 29/38* (2013.01); *G06F 3/123* (2013.01);
(Continued)

(58) Field of Classification Search
USPC .............................................. 358/1.13–1.15
See application file for complete search history.

(56) References Cited

U.S. PATENT DOCUMENTS

2003/0058471 A1* 3/2003 Okubo ............... H04N 1/00
358/1.16
2006/0222176 A1  10/2006 Ohishi
(Continued)

FOREIGN PATENT DOCUMENTS

JP   2010152877 A   7/2010
JP   2012018523 A   1/2012

OTHER PUBLICATIONS

International Search Report issued in Intl. Appln. No. PCT/JP2014/080283 dated Feb. 10, 2015.
(Continued)

*Primary Examiner* — Saeid Ebrahimi Dehkord
(74) *Attorney, Agent, or Firm* — Rossi, Kimms & McDowell LLP

(57) ABSTRACT

An image forming apparatus which is started in a plurality of modes and improved in reliability of the firmware update function. An image forming apparatus includes a storage unit that stores standard firmware for a normal operation and safe firmware for updating the standard firmware, in respective different storage areas. A standard firmware update section updates the standard firmware. Proper operations of the standard firmware update section and the safe firmware update section are verified before updating them, respectively. When the verification of the operation of the standard firmware update section is successful, the standard updating section is caused to perform the update of the standard firmware. When the verification of the operation of the safe firmware update section is successful, the safe firmware update section is caused to perform the update of the safe firmware.

11 Claims, 13 Drawing Sheets

(51) Int. Cl.
*B41J 29/38* (2006.01)
*G06F 11/00* (2006.01)
*G06F 3/12* (2006.01)

(52) U.S. Cl.
CPC ............ *G06F 3/1288* (2013.01); *G06F 11/00* (2013.01); *H04N 1/00* (2013.01); *H04N 1/00965* (2013.01)

(56) References Cited

U.S. PATENT DOCUMENTS

2009/0235242 A1\* 9/2009 Kawaguchi ........ H04N 1/00002
717/168
2010/0185859 A1 7/2010 Unagami et al.

OTHER PUBLICATIONS

Written Opinion issued in Intl. Appln. No. PCT/JP2014/080283 dated Feb. 10, 2015.

\* cited by examiner

FIG. 4A

```
------------------------------------
VERSION
Standard Firmware          3.00
  .
  .
  .
  .
------------------------------------
```

FIG. 4B

```
------------------------------------
VERSION
Standard Firmware          4.00
  .
  .
  .
  .
------------------------------------
```

FIG. 4C

```
------------------------------------
FirmwareDownload           100%
Standard Firmware           -%

Safe Firmware               -%
------------------------------------
```

FIG. 4D

```
------------------------------------
FirmwareDownload           100%
Standard Firmware           50%

Safe Firmware               -%
------------------------------------
```

FIG. 4E

```
------------------------------------
FirmwareDownload           100%
Standard Firmware          100%

Safe Firmware               -%
------------------------------------
Standard Firmware update is completed.
```

FIG. 4F

```
------------------------------------
VERSION
Safe Firmware              4.00

------------------------------------
```

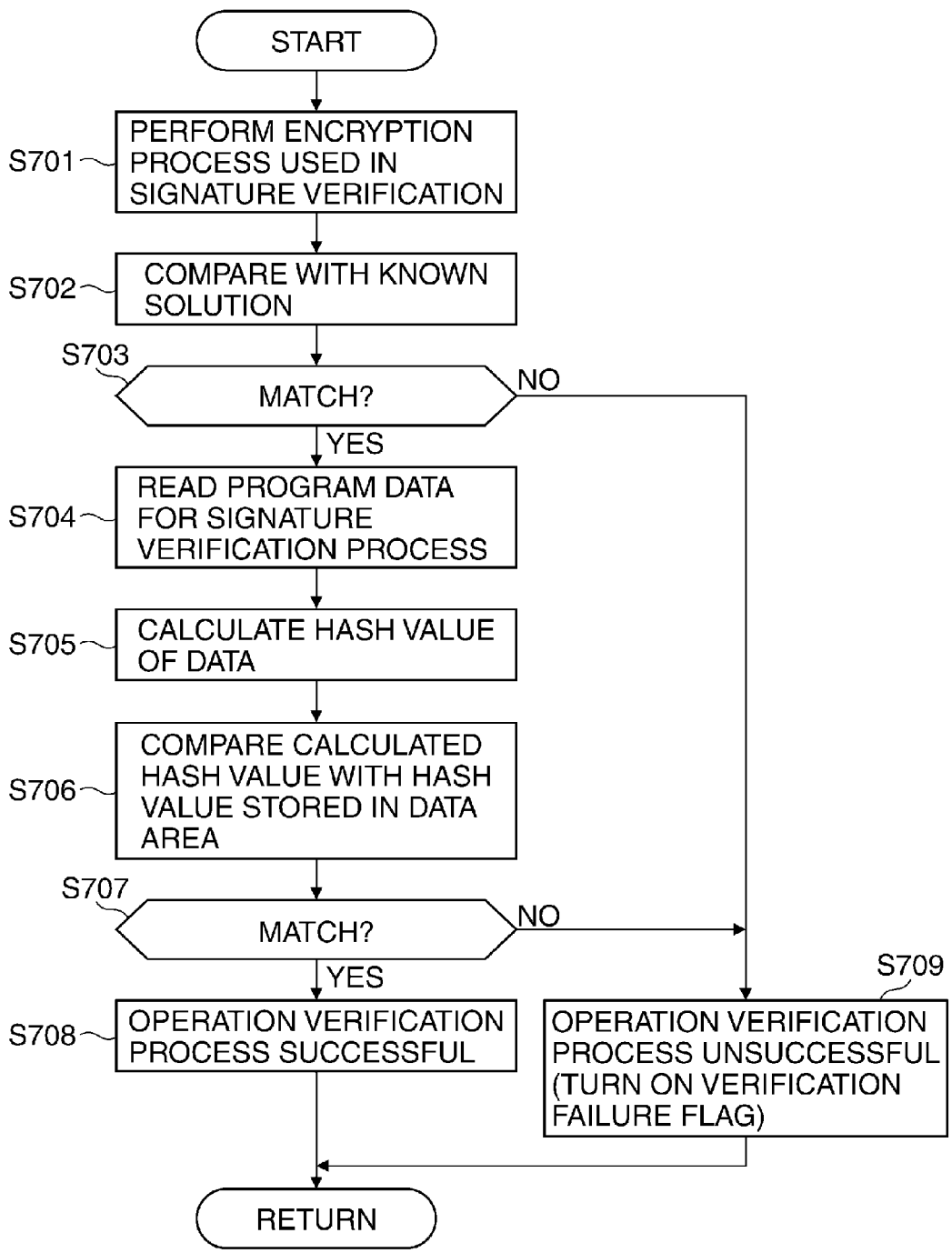

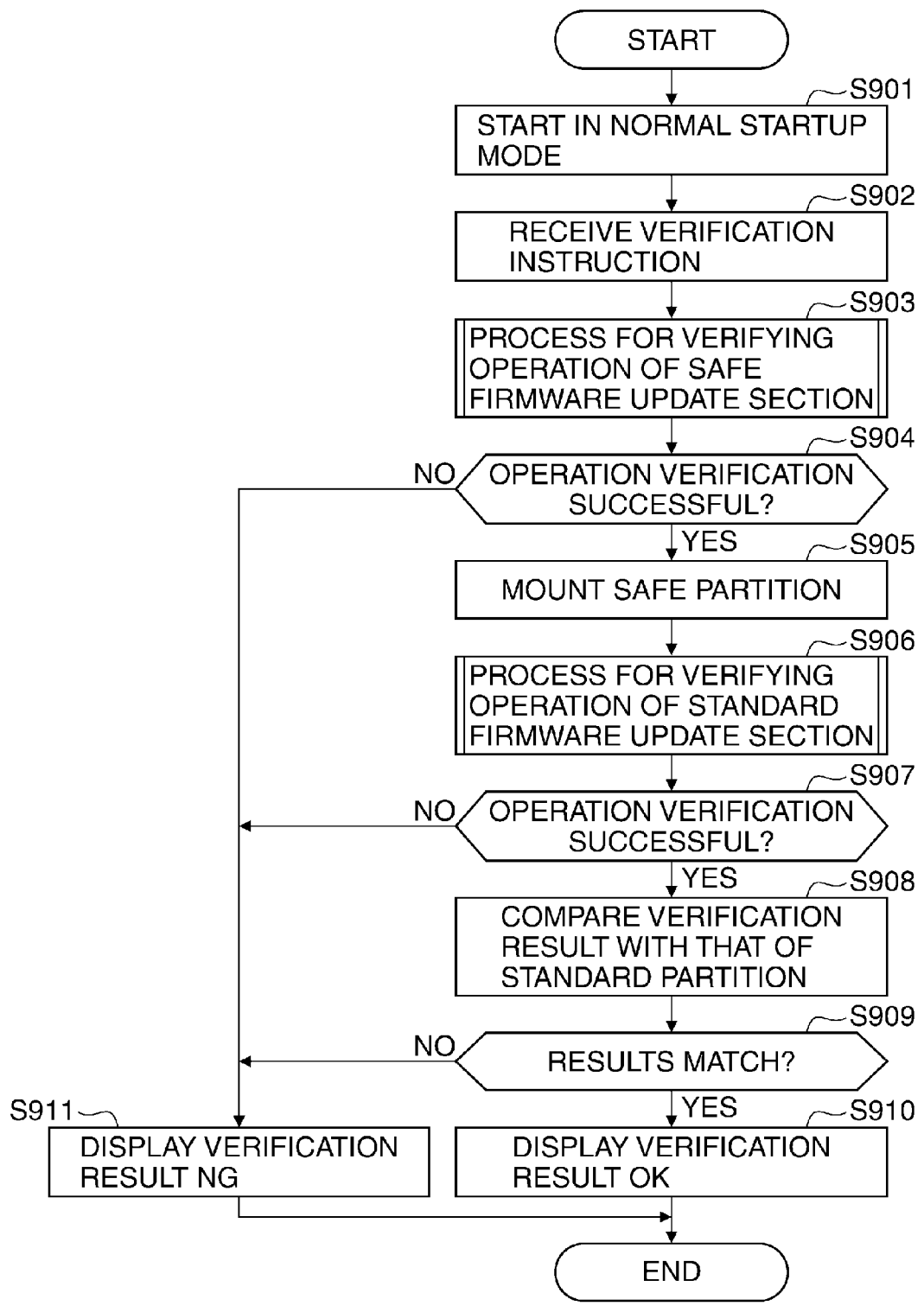

IMAGE FORMING APPARATUS HAVING FIRMWARE UPDATE FUNCTION, METHOD OF CONTROLLING THE SAME, PROGRAM FOR EXECUTING THE METHOD, AND STORAGE MEDIUM

TECHNICAL FIELD

The present invention relates to an image forming apparatus having a firmware update function, a method of controlling the same, and a storage medium, and more particularly to a technique of verifying the firmware update function in the image forming apparatus.

BACKGROUND ART

Conventionally, so-called built-in apparatuses, such as a multifunction peripheral, include one that once shuts down the system thereof when updating firmware, starts the system in another mode so as to update the firmware, and then updates the firmware of the system. A technique for updating the firmware of the multifunction peripheral has been proposed e.g. in PTL (Patent Literature) 1. PTL (Patent Literature) 1 discloses a multifunction peripheral which has a main program for operation as the multifunction peripheral, and a sub program for updating the main program. When updating the firmware of the multifunction peripheral, the main program is operated to acquire update data from a server apparatus or the like, and after rebooting the system, the sub program is operated to update the main program. When the update is completed, the system is rebooted again to operate the updated main program.

In the above-described update of the firmware, there is a fear that the update of the main program, if carelessly performed using update data subjected to unauthorized alteration, allows unauthorized firmware to be installed in the built-in apparatus. To prevent the update using unauthorized firmware, there has been conventionally employed a method of verifying the firmware for update using a signature or the like to thereby confirm its validity (authenticity and integrity), and then updating the firmware.

However, unless this firmware verification function properly functions, due to a failure or unauthorized alteration, it is impossible to prevent unauthorized firmware from being installed in the apparatus. To solve this problem, as a method of checking validity of the firmware verification function, there has been proposed e.g. PTL (Patent Literature) 2. According to PTL (Patent Literature) 2, a plurality of update modules existing in the image forming apparatus mutually verify whether or not each module is free from unauthorized alteration, and transmit the verification results to a management apparatus. The management apparatus disables an update module which is determined to be invalid based on the received verification results. This makes it possible to prevent an invalid update module from operating.

CITATION LIST

Patent Literature

PTL 1: Japanese Patent Laid-Open Publication No. 2012-018523

PTL 2: Japanese Patent Laid-Open Publication No. 2010-152877

SUMMARY OF INVENTION

Technical Problem

However, in the technique described in PTL (Patent Literature) 2, if the main program and the sub program are separated as in PTL (Patent Literature) 1, the activated programs are different, and hence it is difficult to perform mutual verification of the update modules. Further, in PTL (Patent Literature) 2, since verification of the update modules is executed within the image forming apparatus, and the verification results are transmitted to the management apparatus, in a case where all of the update modules are invalid, or in a case where the contents of communication are illegally altered, it is impossible to find invalidity of the update module.

The present invention has been made in view of these problems, and provides a method that improves reliability of the firmware update function in an apparatus which is started in a plurality of modes.

Solution to Problem

Accordingly, in a first aspect of the present invention, there is provided an image forming apparatus including a storage unit that stores first firmware for use in a normal operation and second firmware for use in updating the first firmware in respective different storage areas, comprising a first update unit configured to update the first firmware, a first verification unit configured to verify whether or not the first update unit properly operates, before updating the first firmware, a first control unit configured to cause the first update unit to perform the update of the first firmware in a case where verification performed by the first verification unit is successful, a second update unit configured to update the second firmware, a second verification unit configured to verify whether or not the second update unit properly operates, before updating the second firmware, and a second control unit configured to cause the second update unit to perform the update of the second firmware in a case where verification performed by the second verification unit is successful.

Accordingly, in a second aspect of the present invention, there is provided an image forming apparatus including a storage unit that stores first firmware for use in a normal operation and second firmware for use in updating the first firmware in respective different storage areas, comprising a first update unit configured to update the first firmware, a first verification unit configured to verify whether or not the first update unit properly operates, before updating the first firmware, a first control unit configured to, in a case where verification performed by the first verification unit is unsuccessful, record a flag, and stop the update of the first firmware to be performed by the first update unit, a second update unit configured to update the second firmware, a second verification unit configured to verify whether or not the second update unit properly operates, before updating the second firmware, and a second control unit configured to cause the second update unit to perform the update of the second firmware in a case where verification performed by the second verification unit is successful, and a determination unit configured to determine whether or not the flag has been recorded, after the second update unit performs the update of the second firmware performed, wherein when it is determined by the determination unit that the flag has been recorded, the first control unit causes the first update unit to perform the update of the first firmware again.

Accordingly, in a third aspect of the present invention, there is provided an image forming apparatus including a storage unit that stores first firmware for use in a normal operation and second firmware for use in updating the first firmware in respective different storage areas, comprising a first update unit configured to update the first firmware, a first verification unit configured to verify whether or not the first update unit properly operates, a second update unit configured to update the second firmware, a second verification unit configured to verify whether or not the second update unit properly operates, a receiving unit configured to receive an instruction for verifying whether or not the first verification unit and the second verification unit properly operate, and a notification unit configured, when the instruction is received by said receiving unit, to send a notification indicative of success or failure of verification according to a result of verification performed by said first verification unit and a result of verification performed by said second verification unit.

Accordingly, in a fourth aspect of the present invention, there is provided an image forming apparatus including a storage unit that stores first firmware for use in a normal operation and second firmware for use in updating the first firmware in respective different storage areas, comprising a first update unit configured to update the first firmware, a first verification unit configured to verify whether or not the first update unit properly operates, a second update unit configured to update the second firmware, a second verification unit configured to verify whether or not the second update unit properly operates, a reception unit configured to receive data for verification of the first verification unit and the second verification unit from an external apparatus, a first control unit configured to cause the first verification unit to verify whether or not the first update unit properly operates using the received verification data, and cause the second verification unit to verify whether or not the second update unit properly operates using the received verification data, a notification unit configured to transmit results of verification performed by the first control unit to an external apparatus, and thereby make a query about whether or not the first verification unit and the second verification unit properly operate, and a second control unit configured to cause the update by the first update unit and the second update unit to be performed or stopped, according to a notification sent from the external apparatus.

Accordingly, in a fifth aspect of the present invention, there is provided a method of controlling an image forming apparatus including a storage unit that stores first firmware for use in a normal operation and second firmware for use in updating the first firmware in respective different storage areas, comprising verifying whether or not a first update unit that updates the first firmware properly operates, before updating the first firmware, causing the first update unit to perform the update of the first firmware in a case where verification performed by said verifying is successful, verifying whether or not a second update unit that updates the second firmware properly operates, before updating the second firmware, and causing the second update unit to perform the update of the second firmware in a case where verification performed by said second-mentioned verifying is successful.

Accordingly, in a sixth aspect of the present invention, there is provided a method of controlling an image forming apparatus including a storage unit that stores first firmware for use in a normal operation and second firmware for use in updating the first firmware in respective different storage areas, comprising verifying whether or not a first update unit that updates the first firmware properly operates, before updating the first firmware, in a case where verification performed by said verifying is unsuccessful, recording a flag and stopping the update of the first firmware executed by the first update unit, verifying whether or not a second update unit that updates the second firmware properly operates, before updating the second firmware, and causing the second update unit to perform the update of the second firmware in a case where verification performed by said second verification is successful, determining whether or not the flag has been recorded, after the second update unit performs the update of the second firmware, and causing, when it is determined by said determining that the flag has been recorded, the first update unit to perform the update of the first firmware again.

Accordingly, in a seventh aspect of the present invention, there is provided a method of controlling an image forming apparatus including a storage unit that stores first firmware for use in a normal operation and second firmware for use in updating the first firmware in respective different storage areas, comprising verifying whether or not a first update unit that updates the first firmware properly operates, verifying whether or not a second update unit that updates the second firmware properly operates, receiving an instruction for verifying whether or not the first verification unit and said second verification unit properly operate, and sending, when the instruction is received, a notification indicative of success or failure of verification according to a result of said first-mentioned verifying and a result of said second-mentioned verifying.

Accordingly, in an eighth aspect of the present invention, there is provided a method of controlling an image forming apparatus including a storage unit that stores first firmware for use in a normal operation and second firmware for use in updating the first firmware in respective different storage areas, comprising verifying whether or not a first update unit that updates the first firmware properly operates, verifying whether or not a second update unit that updates the second firmware properly operates, receiving data for use in said first-mentioned verifying and said second-mentioned verifying from an external apparatus, causing said first-mentioned verifying to verify whether or not the first update unit properly operates using the received verification data, and causing said second-mentioned verifying to verify whether or not the second update unit properly operates using the received verification data, transmitting results of verifications by said first-mentioned verifying and said second-mentioned verifying to an external apparatus, and thereby making a query about whether or not the first update unit and the second update unit properly operate, and causing the update by the first update unit and the second update unit to be performed or stopped, according to a notification sent from the external apparatus.

Accordingly, in a ninth aspect of the present invention, there is provided a computer-executable program for causing an image forming apparatus to execute any one of the methods described above.

Accordingly, in a tenth aspect of the present invention, there is provided a non-transitory computer-readable storage medium storing a computer-executable program for causing an image forming apparatus to execute any one of the methods described above.

According to the present invention, it is possible to improve reliability of the firmware update function in the apparatus which is started in the plurality of modes.

Further features of the present invention will become apparent from the following description of exemplary embodiments with reference to the attached drawings.

BRIEF DESCRIPTION OF DRAWINGS

FIG. 4A is a diagram showing an example of a screen displayed on a console section when update processing is performed.

FIG. 4B is a diagram showing another example of the screen displayed on the console section when update processing is performed.

FIG. 4C is a diagram showing another example of the screen displayed on the console section when update processing is performed.

FIG. 4D is a diagram showing another example of the screen displayed on the console section when update processing is performed.

FIG. 4E is a diagram showing another example of the screen displayed on the console section when update processing is performed.

FIG. 4F is a diagram showing another example of the screen displayed on the console section when update processing is performed.

FIG. 7 is a flowchart of the process performed in FIGS. 6A and 6B by a firmware update processing verification section, for verifying the signature verification operation of the firmware update section.

FIG. 9 is a flowchart of a process performed in a third embodiment of the present invention, for verifying a signature authentication operation by a firmware update section.

DESCRIPTION OF EMBODIMENTS

The present invention will now be described in detail below with reference to the drawings showing an embodiments thereof.

Figure 1:
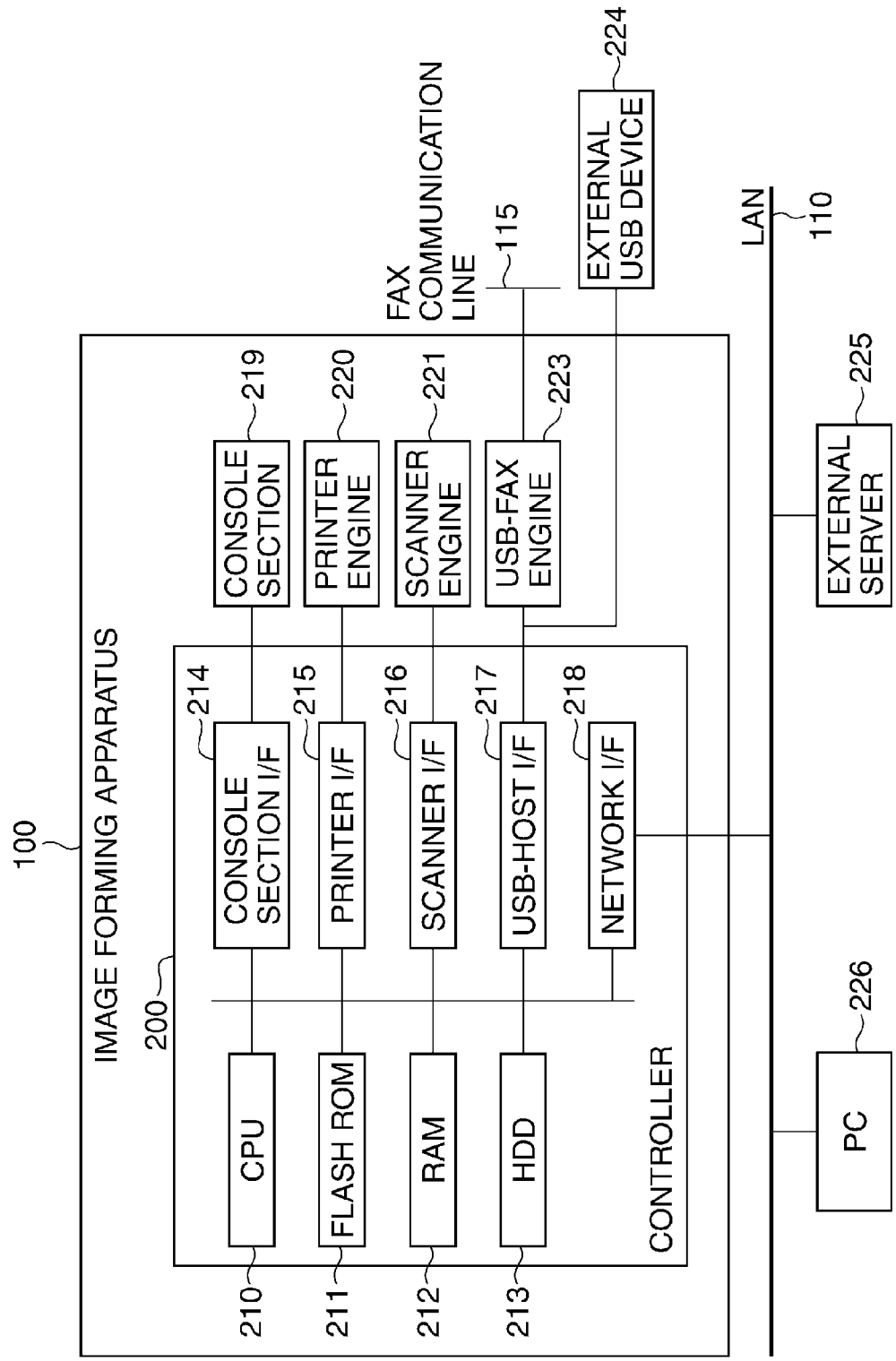
FIG. 1 is a schematic block diagram of an image forming apparatus according to a first embodiment of the present invention.

FIG. 1 is a schematic block diagram of an image forming apparatus according to a first embodiment of the present invention.

Referring to FIG. 1, a controller 200 is configured to control the overall operation of the image forming apparatus, denoted by reference numeral 100, and includes the following components.

A CPU 210 loads programs (firmware) stored in a flash ROM 211 into a RAM 212 to perform various control processes, including reading control, print control, and firmware update control. The flash ROM 211 is a memory also used as a file storage area for updating the firmware, a work area, and a user data area. Note that update firmware is stored in the file storage area of the flash ROM 211 by reading from a USB memory storing the same or downloading via a network.

The RAM 212 is a memory used as a main memory for the CPU 210, and as a work area or the like for temporarily storing various data. A hard disk drive (HDD) 213 is a memory storing e.g. image data and user data. The HDD 213 further stores print data received from a PC 226 via a network interface 218. The HDD 213 may be an SSD (Solid State Drive). Further, the controller 200 may be configured to include a plurality of CPUs.

A console section interface 214 is an interface (I/F) that connects between a console section 219 and the controller 200. The console section 219 is equipped with e.g. a liquid crystal display section having a touch panel function, and operation keys, none of which are shown.

A printer interface 215 is an interface that connects between a printer engine 220 and the controller 200. The printer engine 220 performs printing on a recording medium, such as a sheet, based on image data transferred from the HDD 213 via the printer interface 215.

A scanner interface 216 is an interface that connects between a scanner engine 221 and the controller 200. The scanner engine 221 reads an image on an original to generate image data, and transfers the generated image data to the HDD 213 via the scanner interface 216.

A USB-host interface 217 is an interface that connects between the controller 200, and a USB-FAX engine 223 and/or an external USB device 224. The USB-FAX engine 223 has a function of transmitting image data read by the scanner engine 221 by facsimile via a facsimile communication line 115. Examples of the external USB device 224 include a USB memory and a USB keyboard.

The network interface 218 is a network interface for connecting to a LAN 110. The network interface 218 transmits image data and information to external apparatuses on the LAN 110 (e.g. an external server 225 and the PC 226), and receives update firmware and various information from the external apparatuses. Note that the external server 225 may exist on the Internet.

Next, the programs executed by the CPU 210 of the controller 200 will be described with reference to FIG. 2.

Figure 2:
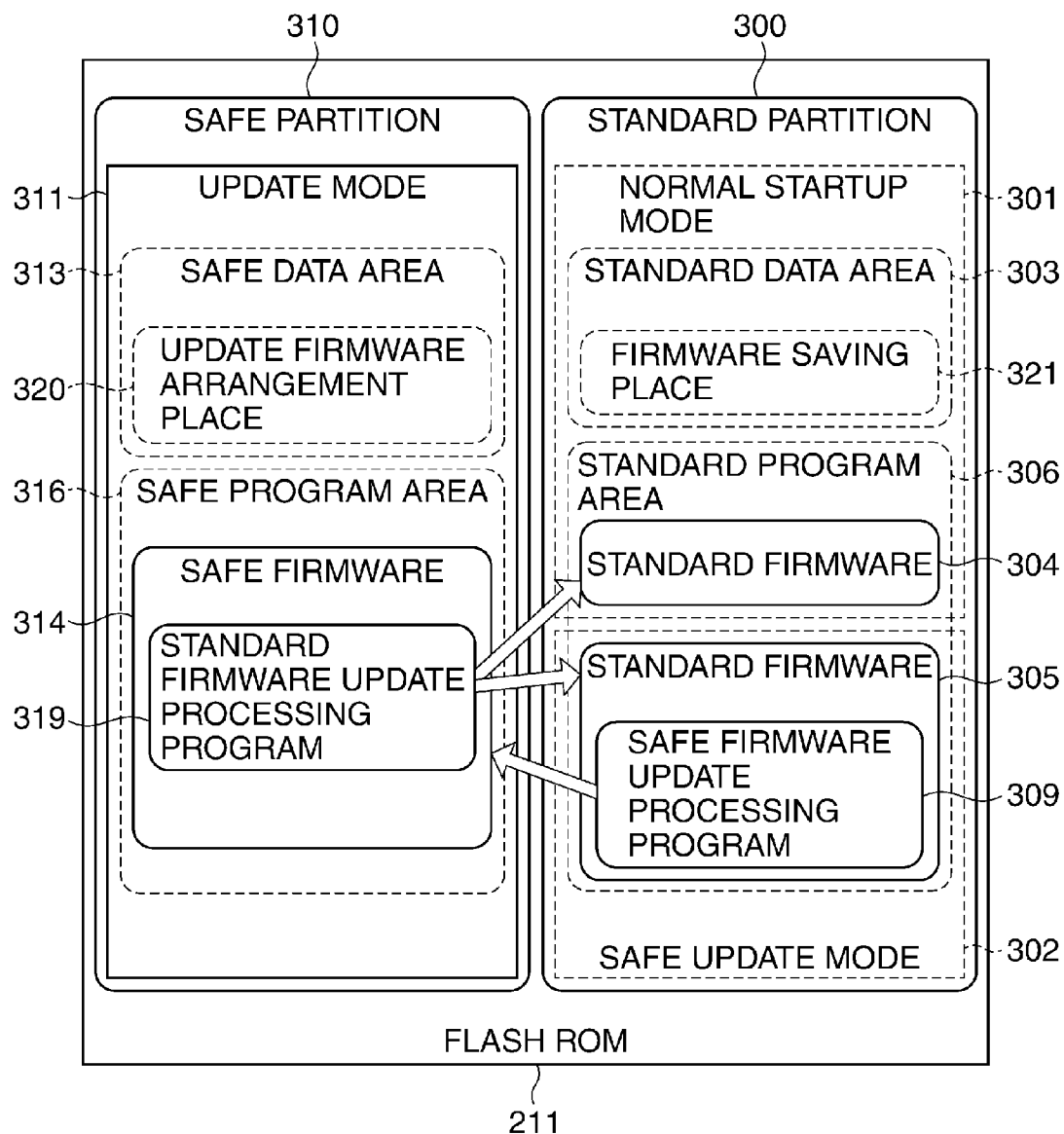
FIG. 2 is a schematic diagram of programs executed by a CPU of a controller.

FIG. 2 is a schematic diagram of programs executed by the CPU 210 of the controller 200. The programs shown in FIG. 2 are stored in the flash ROM 211 and are executed by the CPU 210 of the controller 200 to thereby operate as various function modules.

The flash ROM 211 is divided into two partitions, for example, which are a standard partition 300 and a safe partition 310.

The standard partition 300 is used for two startup modes. One of the two startup modes is a normal startup mode 301, which is a mode for executing a copy job, a print job, and so on. The other one is a safe update mode 302, which is a mode for updating the safe partition 310. Note that although FIG. 2 shows areas in the flash ROM 211 and programs and the like stored therein, the normal startup mode 301 and the safe update mode 302 denoted therein indicate ranges of areas (including the programs and like) used in the respective modes.

On the other hand, the safe partition 310 is used for an update mode 311, which is a startup mode for updating the standard partition 300.

The standard partition 300 is divided into a standard program area 306 and a standard data area 303. The standard program area 306 stores standard firmware 304 which operates during normal startup mode time (normal operation time), and standard firmware 305 which operates during safe update mode time.

The standard firmware 305 which operates during the safe update mode time includes a safe firmware update processing program 309. Although not shown in FIG. 2, the standard firmware 304 and 305 further includes a plurality of program modules other than the safe firmware update processing program 309.

Although in the present embodiment, the standard firmware 304 and the standard firmware 305 are separately illustrated for convenience sake, they are actually the same firmware. A program to be started out of the plurality of programs included in the standard firmware 304 and the standard firmware 305 is different according to the startup mode. More specifically, although the same OS (operating system) is started in the normal startup mode 301 and the safe update mode 302, a copy application program and other applications, for example, are started in the normal startup mode 301, whereas only an update program is started in the safe update mode 302.

The safe firmware update processing program 309 is a program including a process for updating safe firmware 314 in the safe partition 310.

The standard data area 303 is used as a work area for the operation of the standard firmware 304 and a place for storing e.g. user data. Further, a firmware saving place 321 is secured in the standard data area 303. The firmware saving place 321 is used, when updating the firmware, for temporarily saving the firmware before the update. By saving the firmware before the update, if some error is caused during the update, it is possible to write the firmware back to the one before the update.

The safe partition 310 is divided into a safe program area 316 and a safe data area 313. The safe program area 316 stores safe firmware 314 used for the operation in the update mode 311. Further, the safe firmware 314 includes a standard firmware update processing program 319. The standard firmware update processing program 319 includes processing for updating the standard firmware 304 and 305 in the standard partition 300. An update firmware arrangement place 320 is secured in the safe data area 313.

In the update firmware arrangement place 320, the update firmware downloaded from the external USB device 224 (e.g. a USB memory), appearing in FIG. 1, the external server 225, or the PC 226 is placed.

Next, a description will be given of update functions which are realized when the standard firmware update processing program 319 and the safe firmware update processing program 309 are executed, respectively.

Figure 3A:
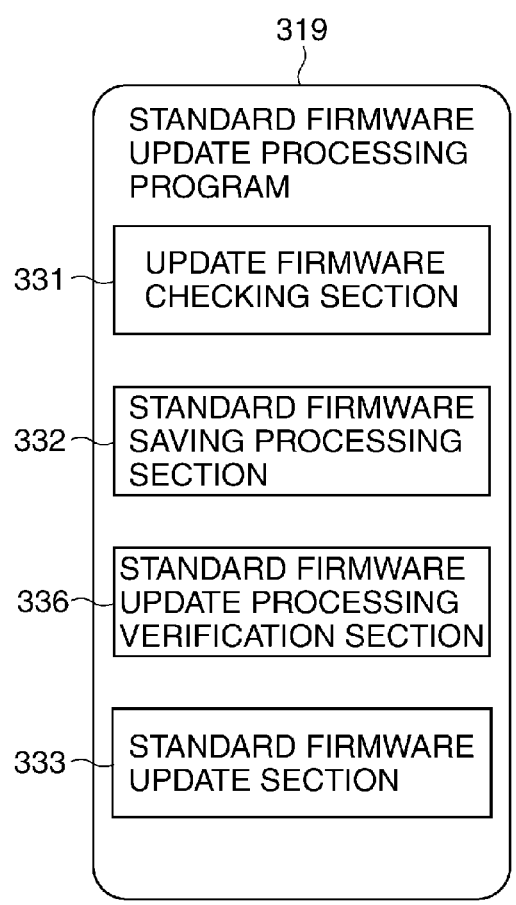
FIG. 3A is a block diagram showing an example of update functions realized when a standard firmware update processing program is executed.

FIG. 3A is a block diagram showing an example of the update functions realized when the standard firmware update processing program 319 is executed. FIGS. 4A to 4F are diagrams each showing an example of a screen displayed on the console section 219 when an update process is performed.

When the update process is performed, first, it is necessary to check the version of base firmware, and hence version information as shown in FIG. 4A is displayed. In the illustrated example, the version of the standard firmware 304 and 305 is displayed as 3.00. In the illustrated example of the update process, a case is considered where the version is updated from 3.00 to 4.00, and hence it is expected that the display on the console section 219 is changed to one shown in FIG. 4B after the update.

First, a description will be given of a process in which the standard firmware update processing program 319 is executed in the update mode 311, whereby the standard firmware 304 and 305 is updated.

In FIG. 3A, the standard firmware update processing program 319 has the functions of an update firmware checking section 331, a standard firmware saving processing section 332, a standard firmware update processing verification section 336, and a standard firmware update section 333.

The update firmware checking section 331 checks whether or not update firmware data downloaded to the update firmware arrangement place 320 is free from corruption. For example, checksum checking or update firmware existence checking is performed. This makes it possible to detect a data loss occurred during downloading the update firmware. At this time, the console section 219 displays such a screen as shown in FIG. 4C.

The standard firmware saving processing section 332 saves the standard firmware 304 and 305 in the firmware saving place 321 of the partition 300. At this time, the standard partition 300 is in a state accessible by the standard firmware update processing program 319 started in the update mode 311 (in a state mounted as a file system).

The standard data area 303 of the standard partition 300 is used for the firmware saving place 321. The standard data area 303 is used as a work area or the like to execute e.g. copy processing and print processing in the normal startup mode 301, similarly to the RAM 212, but it is an area which is not used for such other purposes when the update mode 311 is started. This is to make efficient use of the storage areas in the flash ROM 211 without securing another memory as a firmware saving place.

When the operation performed by the standard firmware saving processing section 332 is finished, the standard firmware update processing verification section 336 verifies whether or not the standard firmware update section 333 properly operates.

When it is found based on the result of verification performed by the standard firmware update processing verification section 336 that the standard firmware update section 333 properly operates, the standard firmware update section 333 updates the standard firmware 304 and 305 of the standard partition 300.

Before executing the update, first, the standard firmware update section 333 executes signature verification for verifying whether or not the update firmware placed in the update firmware arrangement place 320 is valid firmware. If validity (authenticity and integrity) is confirmed based on the result of signature verification, the standard firmware update section 333 executes the update using the update firmware. At this time, the console section 219 displays the progress as shown in FIG. 4D, and finally, if the update is successful, the console section 219 displays such a screen as shown in FIG. 4E.

This completes the process for updating the standard firmware 304 and 305 in the update mode 311.

Next, a description will be given of a process in which the safe firmware update processing program 309 is executed in the safe update mode 302, whereby the safe firmware 314 is updated.

Figure 3B:
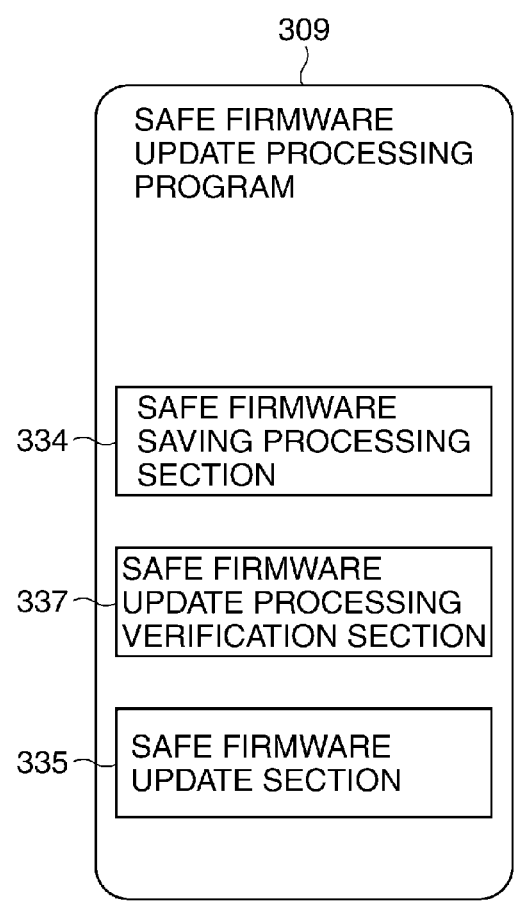
FIG. 3B is a block diagram showing an example of update functions realized when a safe firmware update processing program is executed.

FIG. 3B is a block diagram showing an example of the update functions realized when the safe firmware update processing program 309 is executed.

Referring to FIG. 3B, the safe firmware update processing program 309 has the functions of a safe firmware saving processing section 334, a safe firmware update processing verification section 337, and a safe firmware update section 335.

The safe firmware saving processing section 334 saves the safe firmware 314 in the firmware saving place 321, similarly to the above-mentioned standard firmware saving processing section 332.

When the operation performed by the safe firmware saving processing section 334 is finished, the safe firmware update processing verification section 337 verifies whether or not the safe firmware update section 335 properly operates.

When it is found based on the result of verification performed by the safe firmware update processing verification section 337 that the safe firmware update section 335 properly operates, the safe firmware update section 335 updates the safe firmware 314. Before executing the update, first, the safe firmware update section 335 executes signature verification for verifying whether or not the update firmware is valid firmware, and if validity is confirmed, the safe firmware update section 335 executes the update using the update firmware. If the update is successful, the console section 219 displays such a screen as shown in FIG. 4F, whereby it is possible to confirm that the version of the safe firmware 314 has been changed to 4.00.

Next, a detailed description will be given of the firmware update processes performed by the standard firmware update section 333, appearing in FIG. 3A, and the safe firmware update section 335, appearing in FIG. 3B, respectively, with reference to FIG. 5.

Figure 5:
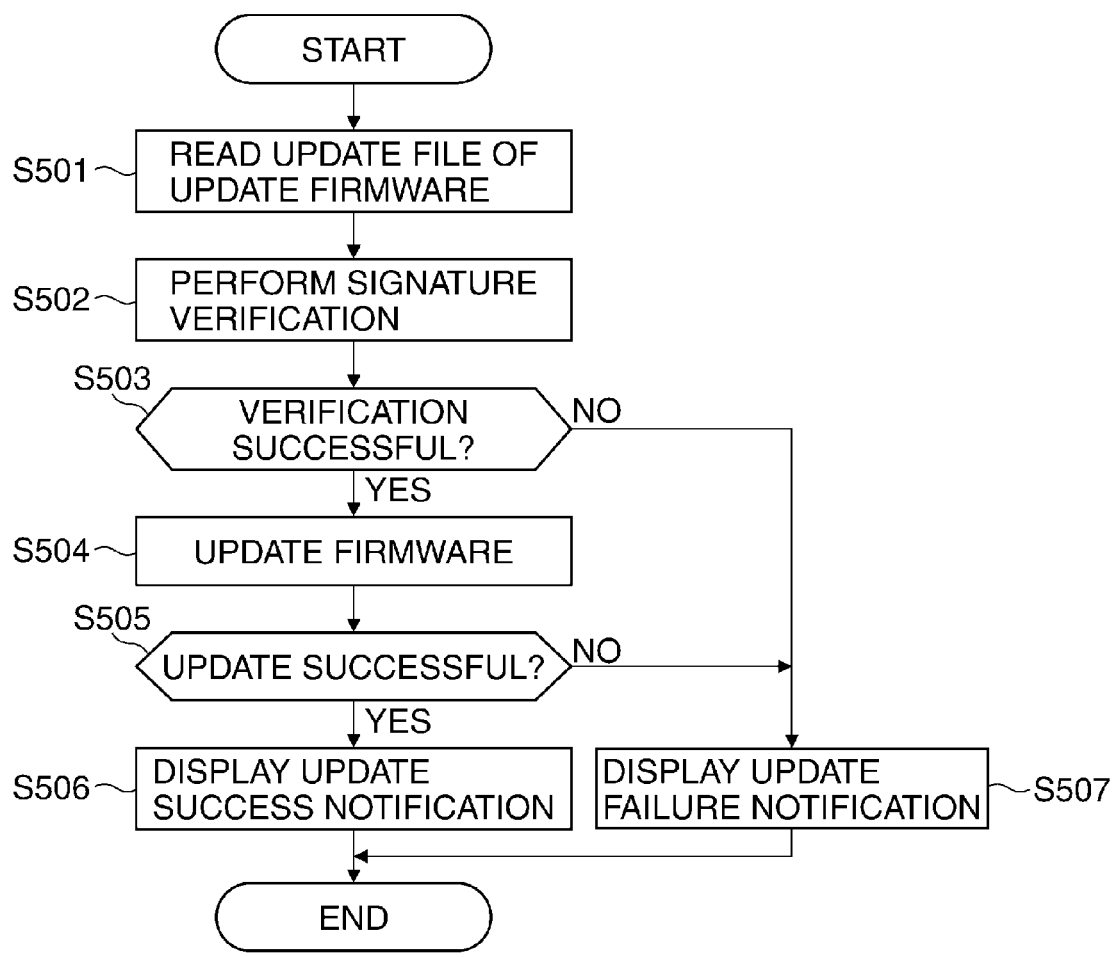
FIG. 5 is a flowchart of an update firmware signature verification process performed by a firmware update section.

FIG. 5 is a flowchart of the firmware update process performed by the firmware update section. The present process is realized by the CPU 210 which executes the standard firmware update processing program 319 or the safe firmware update processing program 309, stored in the flash ROM 211 of the controller 200. Further, the update processes performed by the standard firmware update section 333 and the safe firmware update section 335 are common to each other, and hence the following firmware update process is described as performed by the firmware update processing section. Further, the firmware update process in FIG. 5 is executed in the corresponding steps of a whole update process, described hereinafter with reference to FIGS. 6A and 6B, including a process for verifying the operation of the update section that executes a signature verification process in this firmware update process.

The firmware update processing section, first, executes an update firmware verification process so as to verify that the downloaded update firmware data has been issued from an authorized issuer, and has not been illegally tampered during the process of transfer of the update software.

First, in a step S501, the firmware update processing section reads data of the update firmware from the update firmware arrangement place 320. In this step, a digital signature added to the update firmware is extracted.

Next, in a step S502, the firmware update processing section executes the process for verifying the digital signature extracted in the step S501 using a public key held by the image forming apparatus 100 in advance. The digital signature is generally formed by e.g. a RSA public key encryption method. In the digital signature formed by the public key method, a digest using a one-directional function is generated from a signature object (in this case, the firmware), the issuer encrypts the digest with its own secret key, and the image forming apparatus 100 performs signature verification using the public key of the issuer. The secret key is held only by the authorized issuer, and if the signature verification using the valid public key is successful, it is possible to prove that the signature object is an authorized one. The public key used for the digital signature is the one formed by making use of a public key pair held by the issuer, and is passed from the issuer to the image forming apparatus 100 in advance. As a method of passing the public key, in a case where a network is used, third party certification using a public key infrastructure (PKI) or physical distribution using a memory card can be envisaged, but any known method may be used, and hence detailed description thereof is omitted.

If it is determined in a step S503 that the signature verification is successful, the firmware update processing section executes the update of the firmware (step S504), and the process proceeds to a step S505. On the other hand, if it is determined in the step S503 that the signature verification is unsuccessful, the process proceeds to a step S507.

In the step S505, the firmware update processing section determines whether or not the update of the firmware is successful, and if it is determined that the update is successful, the process proceeds to a step S506, wherein the firmware update processing section displays a notification of success of the update of the firmware on the console section 219, followed by terminating the present process. On the other hand, if it is determined in the step S505 that the update is not normally terminated, the process proceeds to the step S507, wherein the firmware update processing section displays a notification of failure of the update of the firmware on the console section 219, followed by terminating the present process. Note that the update firmware signature verification process executed in the step S502 is not limited to the process using a digital signature, but any other suitable method may be employed, insofar as it is possible to verify the validity of the firmware (e.g. only by comparison of hash values).

In a case where the signature verification process in the step S502 in FIG. 5 does not normally operate due to unauthorized alteration or a failure, it can be erroneously determined in the step S503 that update firmware verification is successful, so that there is a fear that unauthorized firmware may be installed in the image forming apparatus 100. The following description is given of a method, as a solution to this problem, of checking validity of the signature verification process (step S502) before the update so as to prevent the update by the unauthorized firmware from being erroneously executed. Note that the signature verification processes (step S502) performed as part of the respective firmware update processes which are performed by executing the standard firmware update processing program 319 and the safe firmware update processing program 309 are common to each other, and it is assumed that both the processes are executed by the same program.

Figure 6A:
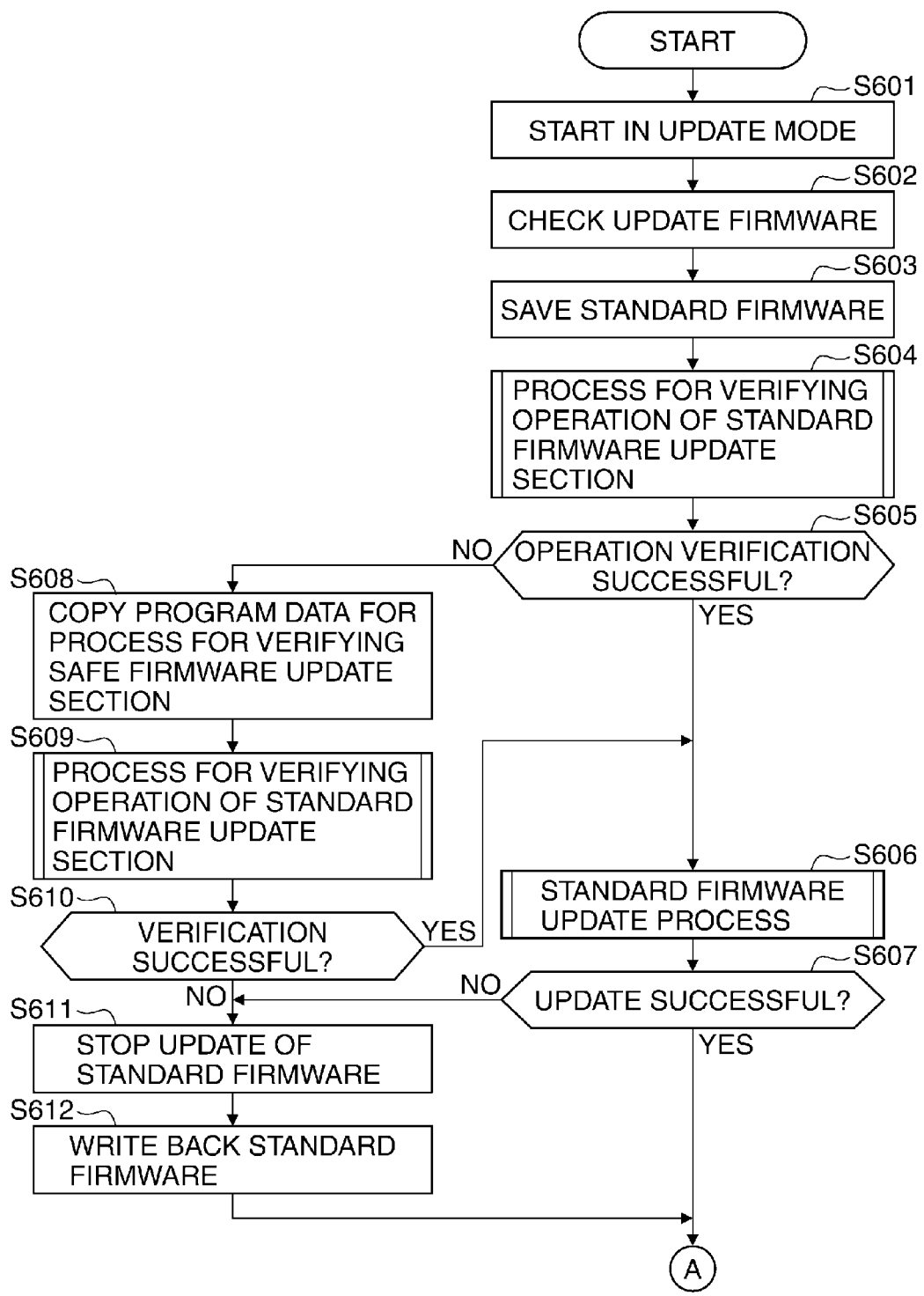
FIG. 6A is a flowchart of a whole update process performed in the first embodiment, including a process for verifying validity of a signature verification operation performed by the firmware update section.
Figure 6B:
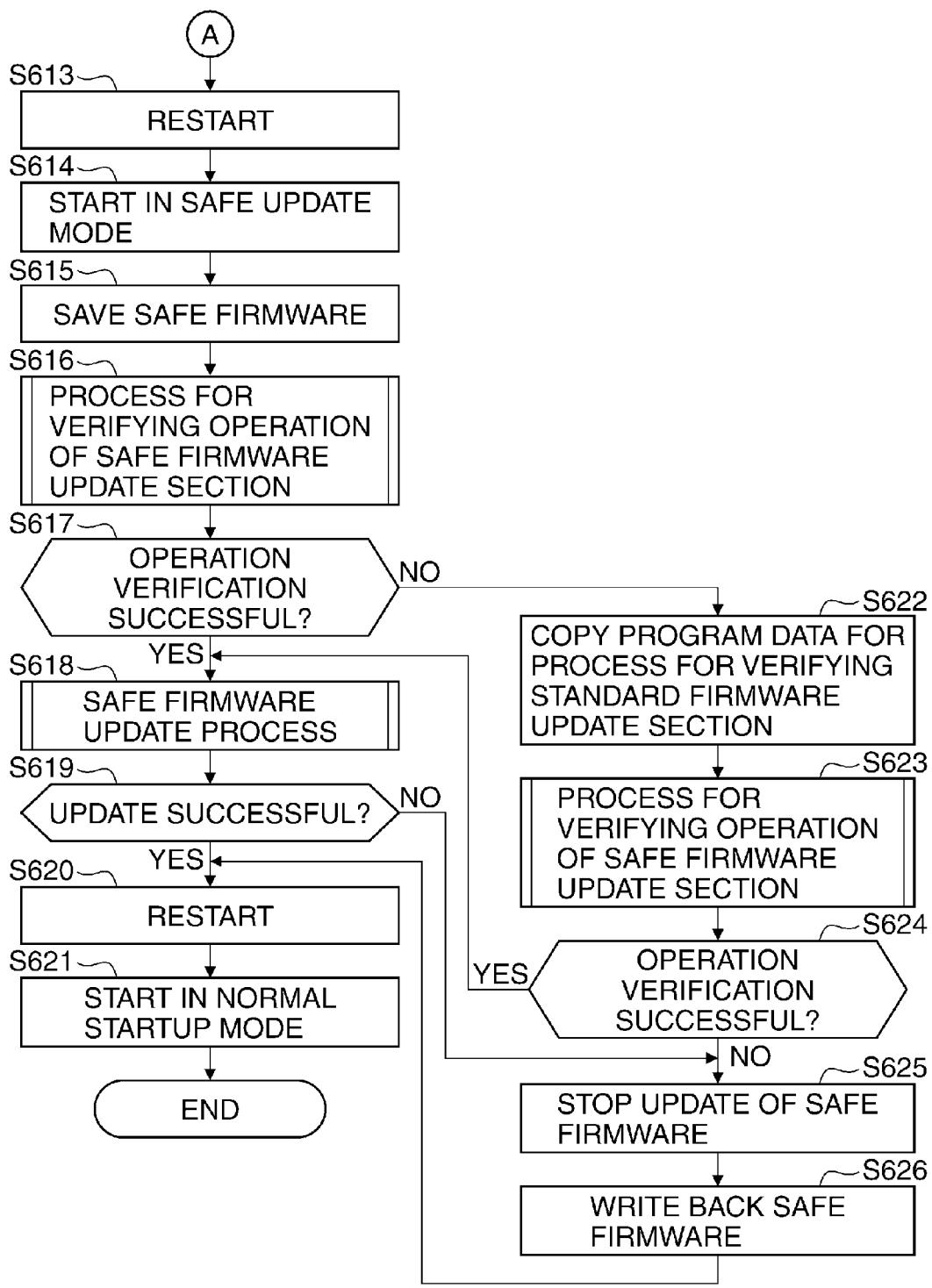
FIG. 6B is a continuation of FIG. 6A.

FIGS. 6A and 6B are a flowchart of the whole update process including a process for verifying validity of a signature verification operation of the firmware update section in the first embodiment. As mentioned above, the update process in FIG. 5 is executed in the corresponding steps of this whole update process. The present process is performed by the CPU 210 which executes software (programs) including the standard firmware 314 and the safe firmware 305, which is stored in the flash ROM 211 of the controller 200.

First, in a step S601, the CPU 210 loads the safe firmware 314 of the safe partition 310 into the RAM 212, and starts the safe firmware 314 in the update mode 311.

Next, in a step S602, the CPU 210 causes the update firmware checking section 331 to perform checking of the data of the update firmware downloaded in the update firmware arrangement place 320. What is checked by the update firmware checking section 331 is described hereinabove.

Next, the process proceeds to a step S603, wherein the CPU 210 causes the standard firmware saving processing section 332 to save the standard firmware 304 and 305 in the firmware saving place 321.

Next, in a step S604, the CPU 210 causes the standard firmware update processing verification section 336 to verify whether or not the standard firmware update section 333 properly operates. Here, the operation process performed by the standard firmware update processing verification section 336 in the step S604 will be described in detail with reference to FIG. 7.

FIG. 7 is a flowchart of the process executed in the step S604 in FIG. 6A by the standard firmware update processing verification section 336, for verifying the signature verification operation of the standard firmware update section 333.

Referring to FIG. 7, in a step S701, the CPU 210 executes encryption processing using a known input to check whether or not encryption processing in the signature verification (step S502) is to be performed by the standard firmware update section 333 that properly operates. In the present embodiment, as described with reference to FIG. 5, RSA encryption/decryption processing is performed so as to use RSA encryption processing for signature verification.

Next, in a step S702, the CPU 210 compares the result of processing in the step S701 and a known solution. If the logic of encryption processing is correct, a specific value is output from a specific input, and hence if the processing result is equal to the known solution, it is possible to judge that the logic of encryption processing is correct. Although it is assumed that the known solution is included in the standard firmware update processing program 319, the known solution may be stored in advance in the safe data area 313 together with the input value.

If it is determined in a step S703 that the respective values of the processing result and the known solution match, the process proceeds to a step S704, wherein the CPU 210 reads program data for the signature verification process in the standard firmware update section 333, using the standard firmware update processing verification section 336.

Next, in a step S705, the CPU 210 calculates a hash value from the program data read in the step S704.

Next, in a step S706, the CPU 210 compares the hash value held in the standard data area 303 in advance and the hash value calculated in the step S705. By comparing the hash values, it is possible to check completeness of the signature verification processing program data of the standard firmware update section 333. Although in the present embodiment, completeness of the program data is verified by comparing the hash values, verification may be performed using a digital signature.

If it is determined in a step S707 that the hash values match, the CPU 210 judges that the process for verifying the operation of the standard firmware update section 333 is successful (step S708), and the process returns to the main routine. On the other hand, if it is determined in the step S707 that the hash values do not match, the CPU 210 judges that the process for verifying the operation of the standard firmware update section 333 is unsuccessful and turn on a verification failure flag, referred to hereinafter, (step S709), and the process returns to the main routine.

The process described above is the process performed in the step S604 (and a step S609, referred to hereinafter) in FIG. 6A, by the standard firmware update processing verification section 336, for verifying the operation of the standard firmware update section 333. Note that the safe firmware update processing verification section 337 also performs verification of operation of the safe firmware update section 335 in the same manner in steps S616 and S623 in FIG. 6B, referred to hereinafter.

Referring back to FIG. 6A, if it is determined in a step S605 that verification of the operation of the standard firmware update section 333 by the standard firmware update processing verification section 336 is successful, the process proceeds to a step S606, wherein CPU 210 continues the process for updating the firmware. On the other hand, if it is determined in the step S605 that the operation verification is unsuccessful, the process proceeds to a step S608. If the update is executed using the firmware update section which has failed in operation verification, there is a possibility that unauthorized firmware is installed in the image forming apparatus 100. For this reason, in the step S608, the CPU 210 updates the standard firmware update processing program 319. More specifically, in the step S608, the CPU 210 acquires the program data for the signature verification process included in the safe firmware update section 335 of the safe firmware update processing program 309 stored in the standard partition 300. Then, the CPU 210 replaces the program data of the standard firmware update section 333 of the standard firmware update processing program 319 by the acquired program data.

Next, in the step S609, the CPU 210 causes the standard firmware update processing verification section 336 to perform the operation verification process again on the updated standard firmware update section 333. Details of this process are the same as the step S604 (see FIG. 7).

If it is determined in a step S610 that the operation verification performed by the standard firmware update processing verification section 336 is successful, the process proceeds to the step S606, wherein the CPU 210 continues the process for updating the firmware. On the other hand, if it is determined in the step S610 that the operation verification is unsuccessful, the process proceeds to a step S611, wherein CPU 210 stops the firmware update process. Then, in a step S612, the CPU 210 writes back the standard firmware 304 and 305 which have been saved in the step S603. Then, the CPU 210 proceeds to a step S613 in FIG. 6B.

In the step S606, the CPU 210 performs the process for updating the standard firmware 304 and 305 by the standard firmware update section 333. The update process in the step S606 is as described with reference to FIG. 5.

Next, in a step S607, the CPU 210 determines whether or not the update of the standard firmware 304 and 305 performed by the standard firmware update section 333 is successful. If it is determined that the update is successful, the process proceeds to the step S613. On the other hand, if it is determined in the step S607 that the update is unsuccessful, the process proceeds to the step S611, wherein the CPU 210 stops the update of the standard firmware 304 and 305.

Referring to FIG. 6B, in the step S613, the CPU 210 restarts the image forming apparatus 100. Next, in a step S614, the CPU 210 loads the standard firmware 305 of the standard partition 300 into the RAM 212, and starts the standard firmware 305 in the safe update mode 302 to perform the update of the safe firmware 314.

In a step S615, the CPU 210 causes the safe firmware saving processing section 334 to save the safe firmware 314 in the firmware saving place 321.

Next, in the step S616, the CPU 210 causes the safe firmware update processing verification section 337 to verify whether or not the safe firmware update section 335 properly operates. The verification is performed in the same manner as in the step S604, and hence description thereof is omitted, but in this step, verification is performed on the signature verification operation of the safe firmware update section 335.

In a step S617, the CPU 210 determines whether or not the operation verification performed by the safe firmware update processing verification section 337 is successful. If it is determined in the step S617 that the operation verification is successful, the process proceeds to a step S618, whereas if it is determined that the operation verification is unsuccessful, the process proceeds to a step S622.

In the step S622, reversely to the step S608, the CPU 210 acquires the program data for the signature verification process, which is included in the standard firmware update section 333 of the standard firmware update processing program 319 stored in the safe partition 310. Then, the CPU 210 replaces the program data of the safe firmware update section 335 by the acquired program data.

Next, in the step S623, the CPU 210 causes the safe firmware update processing verification section 337 to perform the operation verification process again on the updated safe firmware update section 335 (see FIG. 7).

If it is determined in a step S624 that the operation verification performed by the safe firmware update processing verification section 337 is successful, the process proceeds to the step S618, wherein the CPU 210 continues the process for updating the firmware. On the other hand, if it is determined in the step S624 that the operation verification is unsuccessful, the process proceeds to a step S625, wherein the CPU 210 stops the firmware update process.

In the step S618, the CPU 210 causes the safe firmware update section 335 to perform the process for updating the safe firmware 314. Similarly to the step S606, the update process in the step S618 is as described with reference to FIG. 5.

Next, in a step S619, the CPU 210 determines whether or not the update of the safe firmware 314 executed by the safe firmware update section 335 is successful. If it is determined that the update is successful, the CPU 210 proceeds to a step S620.

In the step S620, the CPU 210 restarts the image forming apparatus 100, and the process proceeds to a step S621, wherein the CPU 210 loads the standard firmware 304 of the standard partition 300 into the RAM 212, and starts the standard firmware 304 in the normal startup mode 301, followed by terminating the present process.

On the other hand, if it is determined in the step S619 that the update is unsuccessful, the process proceeds to the step S625, wherein the CPU 210 stops the update of the safe firmware 314. Then, in a step S626, the CPU 210 writes back the safe firmware 314 saved in the step S615, and executes the step S620 et seq., followed by terminating the present process.

According to the above-described embodiment, before executing the update of the standard firmware 304 and 305 or the safe firmware 314, the program of each firmware update section which updates the associated firmware is verified. This makes it possible to prevent unauthorized firmware from being installed in the image forming apparatus, and thereby improve reliability of the firmware update function for the apparatus which is started in the plurality of modes.

Next, a second embodiment of the present invention will be described. In this embodiment, there is used a method in which in a case where the process for verifying a firmware update section in one partition is unsuccessful, the process for updating the other partition is performed first to update a firmware update section therein. This method will be described with reference to FIGS. 8A and 8B.

The image forming apparatus 100 according to the second embodiment has the same configuration as that (shown in FIG. 1) in the first embodiment, and the same components as those of the first embodiment are denoted by the same reference numerals, while omitting description thereof. The following description will be given mainly of different points from the first embodiment.

Figure 8A:
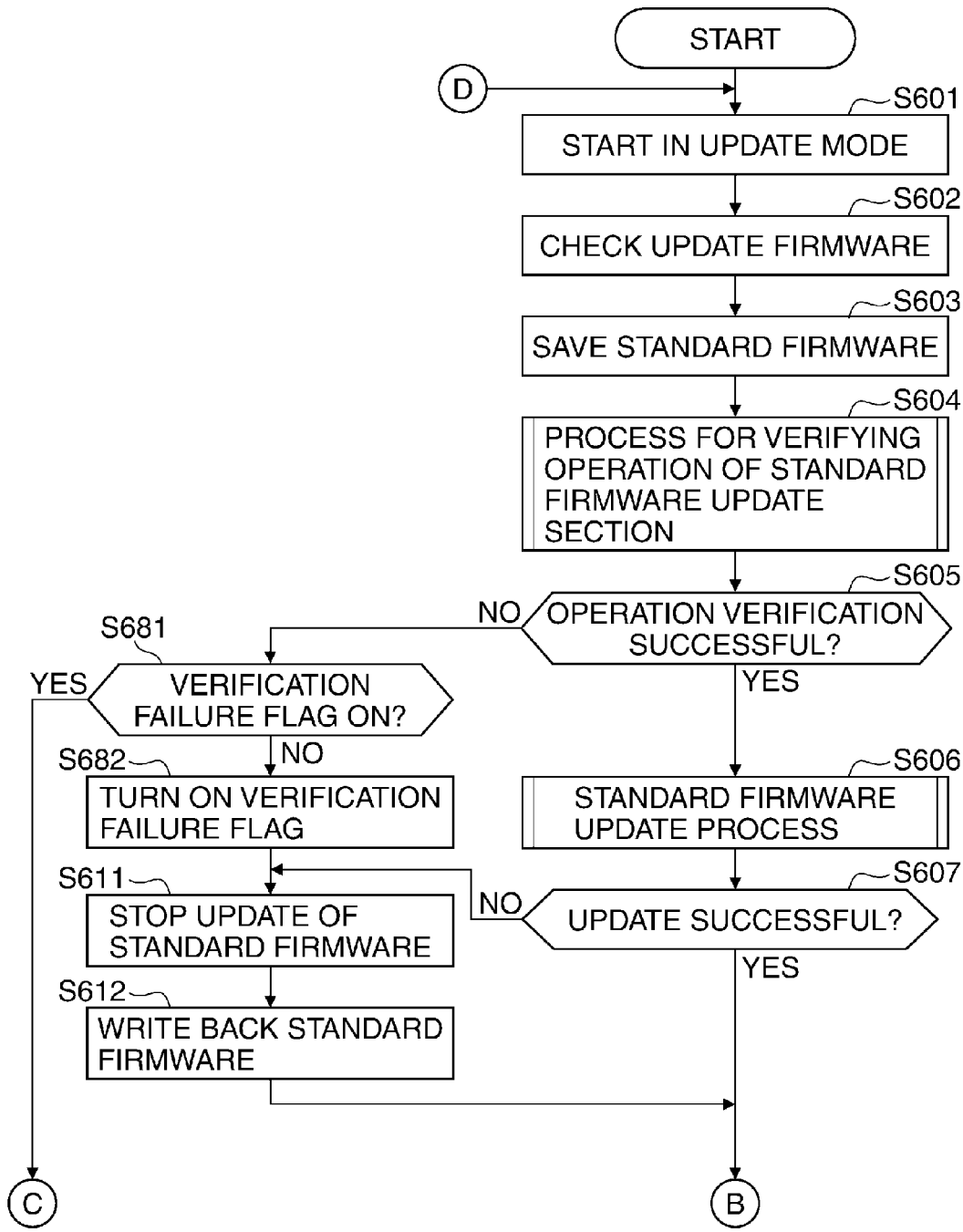
FIG. 8A is a flowchart of a whole update process performed in a second embodiment of the present invention, including a process for verifying validity of a signature authentication operation by a firmware update section.
Figure 8B:
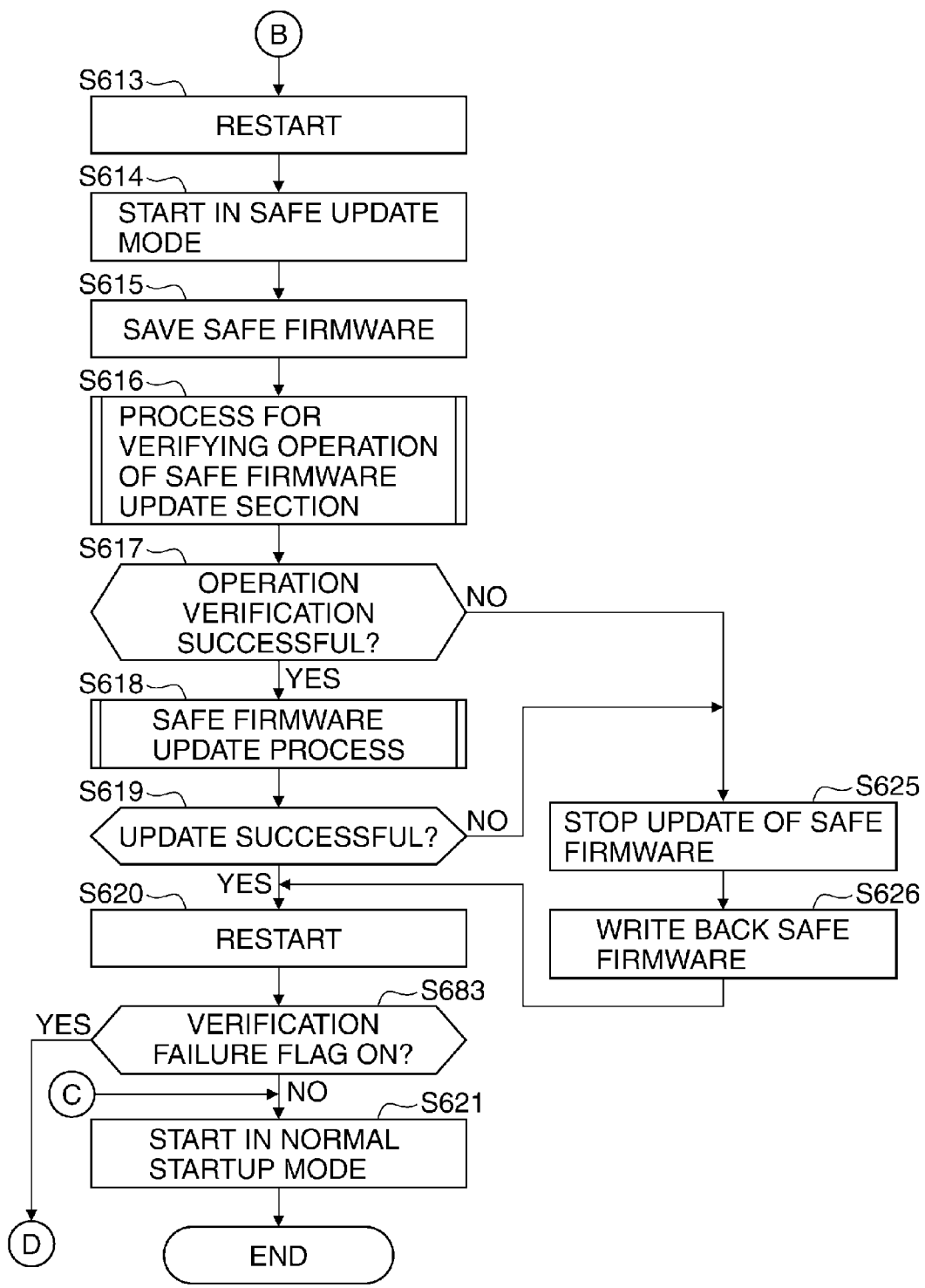
FIG. 8B is a continuation of FIG. 8A.

FIGS. 8A and 8B are a flowchart of the whole update process performed in the second embodiment, including a process for verifying validity of a signature verification operation of the firmware update section. The present process is performed by the CPU 210 which executes software (programs) including the standard firmware 314 and the safe firmware 305, which is stored in the flash ROM 211 of the controller 200. The same steps as those in FIGS. 6A and 6B are denoted by the same step numbers, and description thereof is omitted.

Referring to FIG. 8A, if it is determined in the step S605 that the operation verification executed by the standard firmware update processing verification section 336 is unsuccessful, the process proceeds to a step S681.

In the step S681, the CPU 210 determines whether or not the verification failure flag has already been turned on by the standard firmware update processing verification section 336. If it is determined that the verification failure flag has not been turned on yet, the process proceeds to a step S682, wherein the CPU 210 causes the standard firmware update processing verification section 336 to turn on the verification failure flag, and the process proceeds to the step S611. The verification failure flag is recorded in a nonvolatile memory, such as the flash ROM 211. Although in the present embodiment, whether or not the verification failure flag is on is determined by generating a specific file in the standard data area 303, the determination method is not limited to this.

On the other hand, if it is determined in the step S681 that the verification failure flag has already been turned on, it is judged that the verification has already failed once, and the process to the step S621 in FIG. 8B without performing the update process.

Referring to FIG. 8B, after the image forming apparatus 100 is restarted in the step S620, the CPU 210 proceeds to a step S683, wherein the CPU 210 determines whether or not the verification failure flag is on. If it is determined that the verification failure flag is on, the process returns to the step S601 in FIG. 8A, wherein the CPU 210 loads the safe firmware 314 in the safe partition 310 into the RAM 212, and starts the safe firmware 314 again in the update mode 311. Then, the process for updating the standard firmware is performed again. That is, even when it is determined in the step S605 that verification of the standard firmware update section 333 is unsuccessful, the safe firmware 314 is updated in the steps S614 to S620. Therefore, by using the standard firmware update section 333 included in the updated safe firmware 314, it is made possible to perform update of the standard firmware 304 and 305.

According to the above-described embodiment, even when the firmware update section in one of the standard partition 300 and the safe partition 310 becomes invalid, the update is performed using the firmware update section in the other. This makes it possible to normally maintain the firmware update function for the apparatus which is started in the plurality of modes.

Next, a third embodiment of the present invention will be described. In this embodiment, there is used a method in which an administrator of the image forming apparatus 100 verifies validity of the firmware update process at a desired timing. This method will be described with reference to FIG. 9.

The image forming apparatus 100 according to the third embodiment has the same configuration as that (shown in FIG. 1) in the first embodiment, and the same components as those of the first embodiment are denoted by the same reference numerals, while omitting description thereof. The following description will be given only of different points from the first embodiment.

FIG. 9 is a flowchart of a process performed in the third embodiment of the present invention, for verifying the operation of the firmware update section. The present process is performed by the CPU 210 which executes associated software stored in the flash ROM 211 of the controller 200.

Referring to FIG. 9, in a step S901, the CPU 210 loads the standard firmware 304 of the standard partition 300 into the RAM 212 and starts the standard firmware 304 in the normal startup mode 301.

Next, in a step S902, the CPU 210 receives a verification instruction. The verification instruction is received as a result of selection of "verification of the update process" by the administrator from a menu screen, not shown, displayed on the console section 219. Although the description is given of a case where the instruction is received from the console section 219, the instruction may be received from e.g. an external apparatus via the network interface 218.

Next, in a step S903, the CPU 210 executes operation verification by the safe firmware update processing verification section 337 in the standard partition 300. The verification is performed in the same manner as described with reference to FIG. 7. As a result of the operation verification, if it is determined in a step S904 that the operation verification is unsuccessful, the CPU 210 proceeds to a step S911. On the other hand, if it is determined in the step S904 that the operation verification is successful, the process proceeds to a step S905 so as to perform verification of the operation of the standard firmware update section 333 in the safe partition 310.

In the step S905, the CPU 210 mounts the safe partition 310 which is not in use, and loads the standard firmware update processing program 319 into the RAM 212.

Next, in a step S906, the CPU 210 causes the standard firmware update processing verification section 336 to perform operation verification. The verification is performed in the same manner as described with reference to FIG. 7. As a result of the operation verification, if it is determined in a step S907 that the operation verification is unsuccessful, the process proceeds to the step S911. On the other hand, if it is determined in the step S907 that the operation verification is successful, the process proceeds to a step S908, and compares the operation verification result obtained in the step S903 and the operation verification result obtained in the step S906.

Next, if it is determined in a step S909 that the verification results do not match, the process proceeds to the step S911. On the other hand, if it is determined in the step S909 that the verification results match, the CPU 210 proceeds to a step S910, wherein the CPU 210 displays a verification result on the console section 219 to the effect that the firmware update section is valid.

In the step S911, the CPU 210 displays a verification result on the console section 219 to the effect that the firmware update section is invalid. In the case where the verification instruction has been received from an external apparatus via the network interface 218 in the step S902, the CPU 210 notifies the external apparatus of a response to the instruction via the network interface 218.

According to the above-described embodiment, the administrator can check whether or not the firmware update function properly operates at a desired timing.

Next, a fourth embodiment of the present invention will be described. In the first to third embodiments, the process for verifying the operation of the firmware update section (333, 335) is performed within the image forming apparatus 100 as shown in FIG. 7. According to this method, in a case where the firmware update processing verification section (336, 337) itself is all replaced, it is impossible to output a correct result of the operation verification. In view of this, in the fourth embodiment, there is used a method of performing the process for verifying the operation of the firmware update section (333, 335) using a value notified when the firmware is downloaded from the PC 226 or the external server 225, and the method will be described with reference to FIG. 10.

The image forming apparatus 100 according to the fourth embodiment has the same configuration as that (shown in FIG. 1) in the first embodiment, and the same components as those of the first embodiment are denoted by the same reference numerals, while omitting description thereof. The following description will be given only of different points from the first embodiment.

Figure 10:
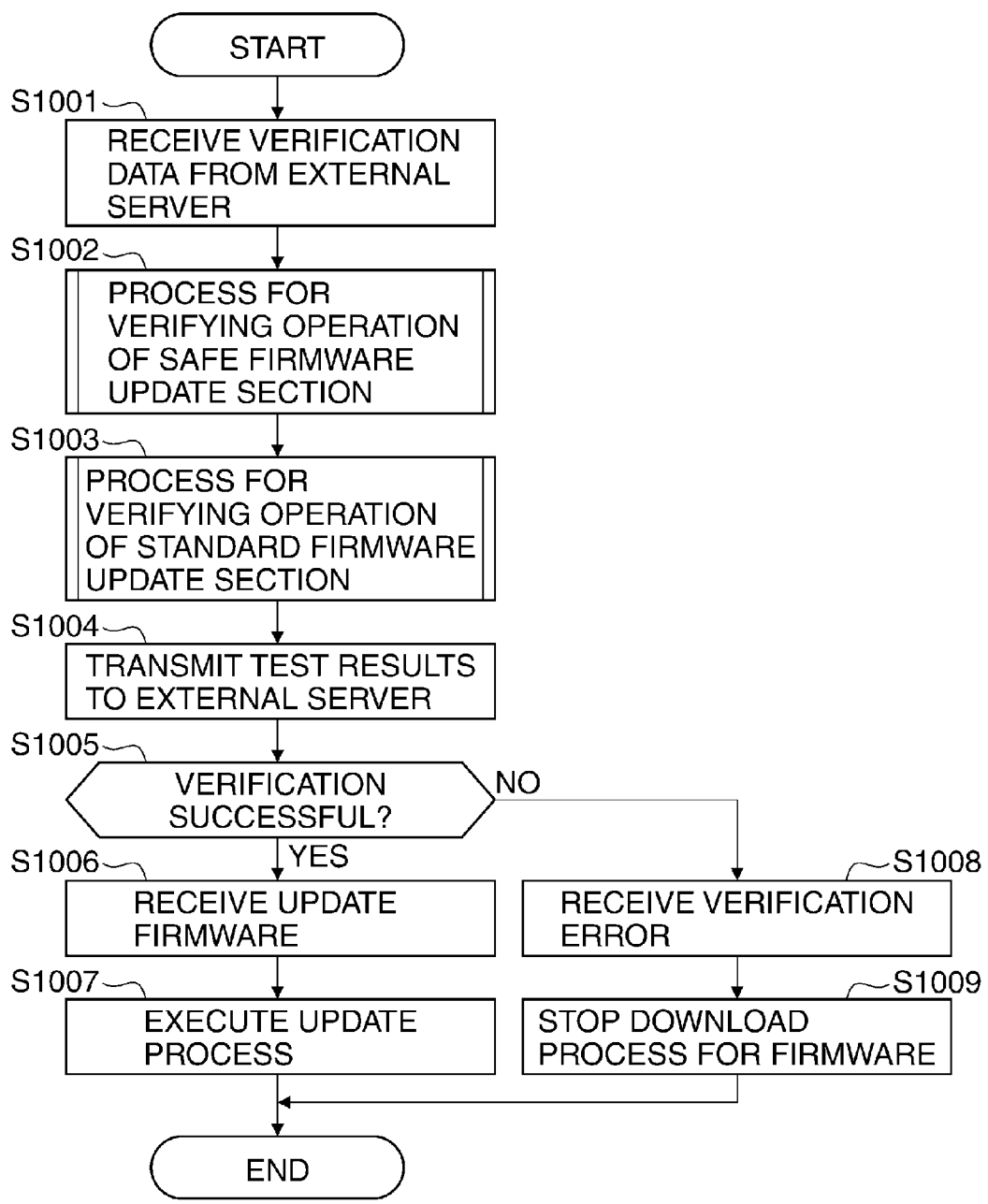
FIG. 10 is a flowchart of a process performed in a fourth embodiment of the present invention, for verifying a signature authentication operation by a firmware update section.

FIG. 10 is a flowchart of a process for verifying the signature authentication operation of the firmware update section, which is performed when the update firmware is downloaded from the external server 225 via the LAN 110 and the network interface 218. The present process is a process in which the image forming apparatus 100 communicates with the external server 225 to download the firmware, and then stores the downloaded firmware in the update firmware arrangement place 320 in the safe partition 310. Further, The present process is performed by the CPU 210 which executes associated software stored in the flash ROM 211 of the controller 200.

First, in a step S1001, the CPU 210 communicates with the external server 225 via the network interface 218, and receives data for verifying the firmware update section.

Next, in a step S1002, the CPU 210 causes the safe firmware update processing verification section 337 to verify whether or not the safe firmware update section 335 properly operates, using the received verification data. Here, details of the verification process performed in the step S1002 will be described with reference to FIG. 11.

Figure 11:
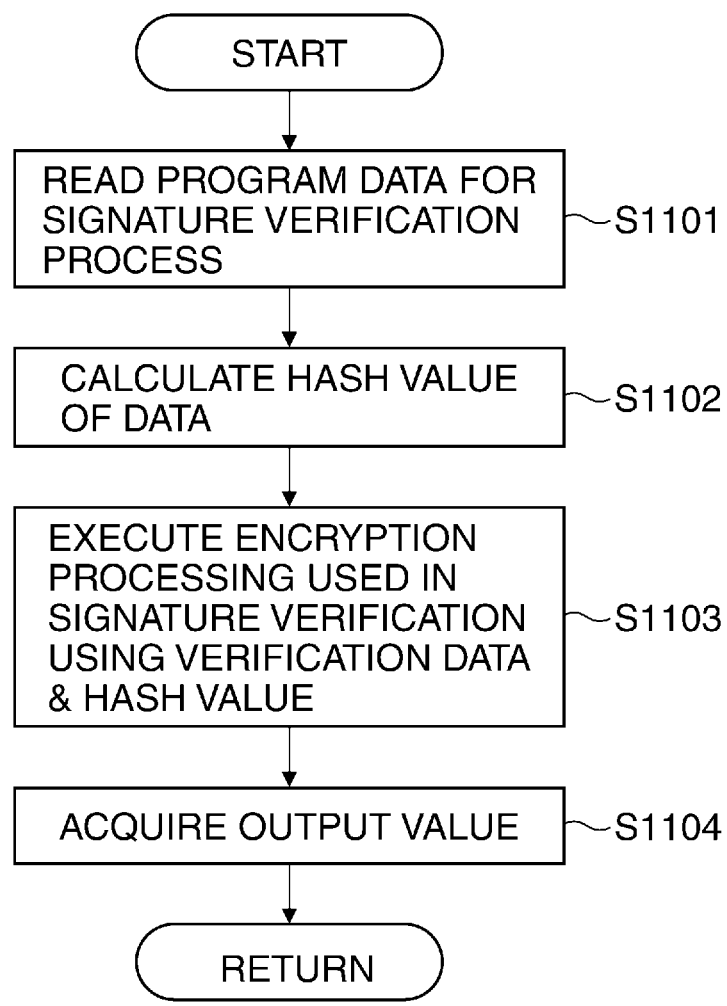
FIG. 11 is a flowchart of a process performed in steps in FIG. 10, for verifying an operation of the firmware update section.

FIG. 11 is a flowchart of the process performed in the step S1002 in FIG. 10, for verifying the operation of the firmware update section 335.

Referring to FIG. 11, in a step S1101, the CPU 210 causes the safe firmware update processing verification section 337 to load program data for the signature verification process in the safe firmware update section 335.

Next, in a step S1102, the CPU 210 causes the safe firmware update processing verification section 337 to calculate a hash value of the read program data.

Next, in a step S1103, the CPU 210 performs encryption processing used in the signature verification, by using the verification data received from the external server 225 and the hash value calculated in the step S1102. Then, the process proceeds to a step S1104, wherein the CPU 210 acquires the output value, and the process returns to the main routine.

Referring back to FIG. 10, in a step S1003, similarly to the step S1102, the CPU 210 causes the standard firmware update processing verification section 336 to verify whether or not the standard firmware update section 333 properly operates.

Next, in a step S1004, the CPU 210 transmits the results of the verification processes performed in the steps S1002 and S1003 to the external server 225.

The external server 225 checks whether or not the verification processes are successful based on the results of the verification processes received from the image forming apparatus 100, and notifies the image forming apparatus 100 of a check result.

If the check result returned from the external server 225 indicates success (YES to a step S1005), the CPU 210 downloads the update firmware from the external server 225 and stores the downloaded update firmware in the update firmware arrangement place 320 (S1006). Then, the CPU 210 executes the update process including the signature verification process using the downloaded update firmware (step S1007).

On the other hand, if the check result indicates failure (NO to the step S1005), and hence notification of a verification error is received from the external server 225 (step S1008), the CPU 210 judges that the safe firmware update section 335 or standard firmware update section 333 which performs the signature verification process does not properly operate, and stops the process for downloading the firmware (step S1009), followed by terminating the present process.

Although in the present embodiment, the description has been given of the method of performing verification using the hash value of the program data and the verification data, any other method may be used insofar as it can check validity of the signature verification process. Further, the timing in which validity is confirmed is not limited to the time at which the update firmware is downloaded, but validity may be confirmed at any other timing.

According to the above-described fourth embodiment, the operation of the firmware update section is verified using the verification data received from the external server 225, whereby it is possible to prevent the verification result from being given by spoofing and thereby perform verification with higher reliability.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

REFERENCE SIGNS LIST 211 flash ROM
220 printer engine
221 scanner engine
223 USB-FAX engine
300 standard partition
301 normal startup mode
302 safe update mode
310 safe partition
311 update mode
336 standard firmware update processing verification section
337 safe firmware update processing verification section

The invention claimed is:

1. An image forming apparatus comprising: a storage unit that stores (i) a first firmware including a control program for controlling at least an image processing of the image forming apparatus and an update control program for controlling update of a second firmware, with (ii) the second firmware controlling update of the control program in the first firmware;

a first update unit configured to update the control program in the first firmware for controlling at least the image processing in the image forming apparatus;

a first verification unit configured to verify, by performing a first verification program, whether or not the second firmware has been tampered with, before updating the first firmware;

a first control unit configured to cause the first update unit to perform the update of the first firmware in a case where it is verified that the second firmware has not been tampered with;

a second update unit configured to update the second firmware used in the updating of the first firmware;

a second verification unit configured to verify, by performing a second verification program, whether or not the update control program has been tampered with, before updating the second firmware; and a second control unit configured to cause the second update unit to perform the update of the second firmware in a case where it is verified that the update control program has not been tampered with.

2. The image forming apparatus according to claim 1, further comprising:

an acquisition unit configured to acquire program data of the second update unit in a case where verification performed by the first verification unit is unsuccessful, and a replacement unit configured to replace program data of the first update unit by the program data acquired by the acquisition unit.

3. The image forming apparatus according to claim 1, further comprising:

an acquisition unit configured to acquire program data of the first update unit in a case where verification performed by the second verification unit is unsuccessful, and a replacement unit configured to replace program data of the second update unit by the program data acquired by the acquisition unit.

4. An image forming apparatus according to claim 1, further comprising:

the first control unit configured to, in a case where verification performed by the first verification unit is unsuccessful, record a flag, and stop the update of the control firmware to be performed by the first update unit;

a determination unit configured to determine whether or not the flag has been recorded, after the second update unit performs the update of the second firmware, wherein when it is determined by the determination unit that the flag has been recorded, the first control unit causes the first update unit to perform the update of the first firmware again.

5. An image forming apparatus according to claim 1, further, comprising:

a receiving unit configured to receive an instruction for verifying whether or not the first verification unit and the second verification are to verify; and a notification unit configured, when the instruction is received by the receiving unit, to send a notification indicative of success or failure of verification according to a result of verification performed by the first verification unit and a result of verification performed by said second verification unit.

6. The image forming apparatus according to claim 5, further comprising a comparison unit configured, when the instruction is received by the receiving unit, to compare the result of verification performed by the first verification and the result of verification performed by the second verification unit.

7. The image forming apparatus according to claim 6, wherein when a result of comparison by the comparison unit shows a match between the result of verification performed by the first verification unit and the result of verification performed by the second verification unit, the notification unit sends a notification indicative of success of the verification.

8. An image forming apparatus according to claim 1 further a reception unit configured to receive data for verification of the first verification program and the second verification program from an external apparatus;

a first control unit configured to cause the first verification unit to verify whether or not the first update program has been tampered using the received verification data, and cause the second verification program to verify whether or not the second update program has been tampered using the received verification data;

a notification unit configured to transmit results of verification caused by the first control unit to an external apparatus, and thereby make a query about whether or not the first verification program and the second verification program has been tampered; and a second control unit configured to cause the update by the first update unit and the second update unit to be performed or stopped, according to a response to the query notified from the external apparatus.

9. The image forming apparatus according to claim 8, wherein in a case where it is determined based on the response received from the external apparatus that the first verification unit and the second verification unit properly operate, the second control unit causes the first update unit and the second update unit perform the update.

10. A method of controlling an image forming apparatus including a storage unit that stores (i) a first firmware including a control program for controlling at least an image processing of the image forming apparatus and an update control program for controlling update of a second firmware, with (ii) the second firmware controlling update of the control program in the first firmware, the method comprising:

verifying, by performing a first verification program, whether or not the second firmware has been tampered with, before updating the first firmware;

causing the update of the first firmware in a case where it is verified that the second firmware has not been tampered with;

verifying, by performing a second verification program, whether or not the update control program has been tampered with, before updating the second firmware; and causing the second update unit to perform the update of the second firmware in a case where it is verified that the update control program has not been tampered with.

11. A non-transitory computer-readable storage medium storing a computer-executable program for causing an image forming apparatus including a storage unit that stores (i) a first firmware including a control program for controlling at least an image processing of the image forming apparatus and an update control program for controlling update of a second firmware, with (ii) the second firmware controlling update of the control program in the first firmware, the method comprising:

verifying, by performing a first verification program, whether or not the second firmware has been tampered with, before updating the first firmware;

causing the update of the first firmware in a case where it is verified that the second firmware has not been tampered with;

verifying, by performing a second verification program, whether or not the update control program has been tampered with, before updating the second firmware; and causing the second update unit to perform the update of the second firmware in a case where it is verified that the update control program has not been tampered with.

* * * * *